(No Model.)
W. G. KYTE & J. A. MARTIN.
GATE.
No. 325,213. Patented Aug. 25, 1885.
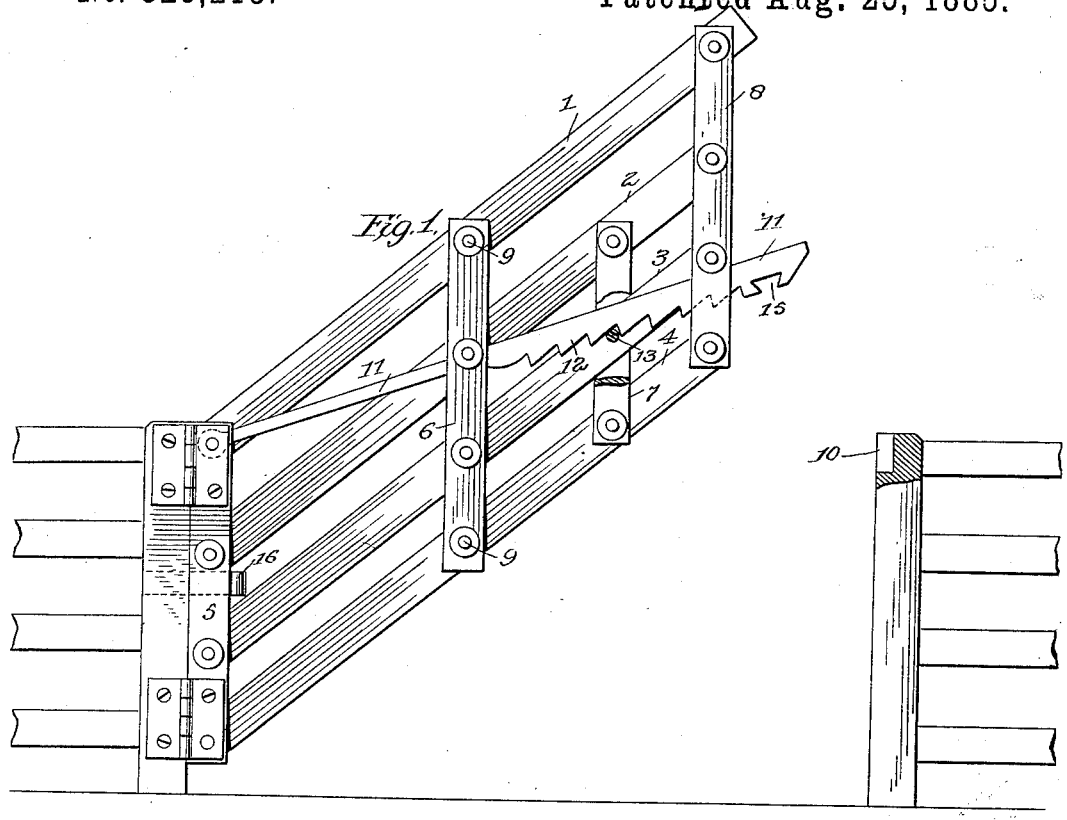
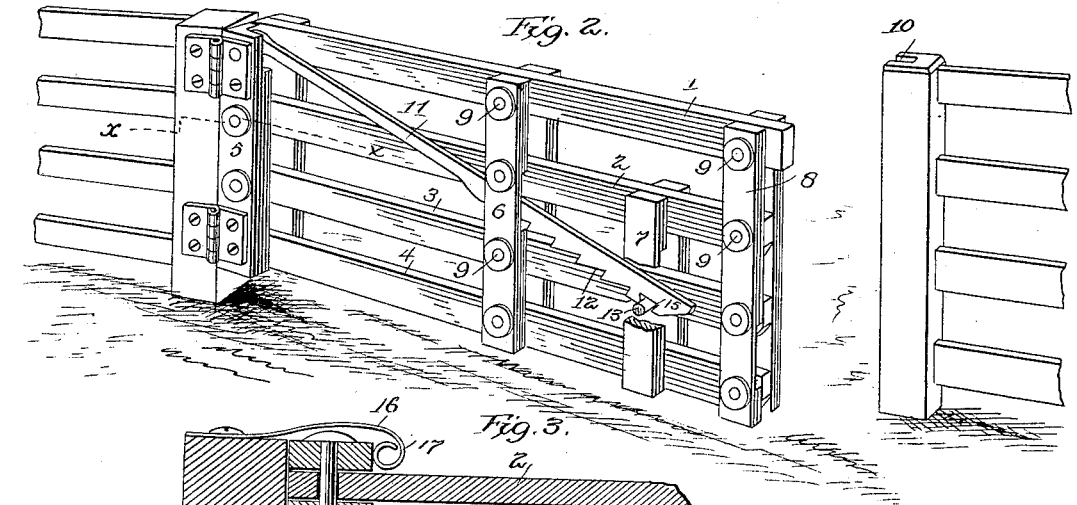
Attest:
Walter Donaldson
F. L. Middleton
Inventors
Wm G. Kyte
Jacob A. Martin
by Joyce & Spear
Attys.

UNITED STATES PATENT OFFICE.

WILLIAM G. KYTE AND JACOB A. MARTIN, OF MIDDLEBURY, INDIANA.

GATE.

SPECIFICATION forming part of Letters Patent No. 325,213, dated August 25, 1885

Application filed April 20, 1885. (No model.)

*To all whom it may concern:*

Be it known that we, WILLIAM G. KYTE and JACOB A. MARTIN, of Middlebury, in the county of Elkhart and State of Indiana, have invented a new and useful Improvement in Gates; and we do hereby declare that the following is a full, clear, and exact description of the same.

Our invention is an improvement in gates, and is more especially applicable to that class of gates known as "farm-gates," designed to admit the passage of wheeled vehicles.

The object of the invention is to prevent sagging of the gate to facilitate its opening and to provide for secure fastening. We have sought to accomplish these objects without adding to the weight of the gate, but rather to diminish the ordinary weight.

In the accompanying drawings, Figure 1 shows the gate in side elevation and in raised position. Fig. 2 is a perspective view showing the gate in its lowered position and slightly opened. Fig. 3 is a section of the post and catch in section on line *x x* of Fig. 2, the gate being shown as closed.

The gate is composed of bars 1, 2, 3, and 4, any desired number of these bars being used. Uprights 5, 6, 7, and 8 are bolted to the bars in such a manner as to allow the bars to turn on the uprights. We prefer to make the bars of strips or boards. The upright pieces may be made of similar material, being connected to the bars by the bolts 9. The upper bar, 1, extends through the upright 8 and forms in connection with the notch 10 in the post a locking device, by means of which the gate is held in a closed position. The pivotal connection between the bars and the uprights allows the gate to be raised to the position shown in Fig. 1. In order to hold the gate in this position we have provided a brace-ratchet, 11. This is pivoted on the upper bolt of the upright 5, and is provided with inclined teeth 12, adapted to catch over a bolt, 13, of the short upright 7. The inner faces of the uprights are cut away to allow free motion of the brace-ratchet, the teeth of which are inclined so as to ride over the bolt as the gate is raised, the vertical faces of the teeth catching on the bolt and holding the gate in an elevated position. At the end of the brace-ratchet is a dovetail-notch, 15, which holds the gate down and prevents its being lifted without first lifting the brace-ratchet, the weight of which tends to hold it in proper position. We prefer to make the brace-ratchet of iron, but do not confine ourselves to this material. Its upper end being pivoted to the upper end of the hinged upright, it is convenient to the hand in raising and drops readily into position, and the gate may be raised with one hand by simply lifting the brace-ratchet. For some purposes it may not be necessary to open the gate, the space left by lifting being sufficient.

In order to hold the gate when it is lifted and to prevent its swinging open, we have provided a spring catch, 16. This may be conveniently made out of a narrow strip of steel by simply turning up one end in the form of a roll, as shown at 17, the other end being fastened to the post. The turned-up end forms a shoulder, adapted to catch the upright and hold the gate in closed position. It may be sprung off for opening the gate. The brace-ratchet is held in position by the intermediate uprights, between which it passes.

The gate may be made of very light material without liability to sag, as the ratchet-brace takes up all the strain which would otherwise fall upon it.

We have shown the gate in Fig. 1 as raised sufficiently for a person to pass; but when the gate is to be swung open it need be raised only far enough to free the end of the upper bar from the notch in the post.

We are aware that it is old to construct swinging gates of uprights and bars pivotally connected together and to provide a brace-ratchet for the purpose of holding the gate in an elevated position, and we do not desire to claim, broadly, these ideas.

We claim as our invention—

In combination, a hinged gate composed of bars and uprights pivotally connected together so as to allow the gate to be lifted, a brace-ratchet for holding the gate in an elevated position, and a spring-catch attached to the post and adapted to catch over the edge of the upright and hold the gate from swinging while in an elevated position, substantially as described.

In testimony whereof we have signed our names to this specification in the presence of two subscribing witnesses.

WILLIAM G. KYTE.
JACOB A. MARTIN.

Witnesses:
ORVILLE T. CHAMBERLAIN,
MICHAEL H. LEVY.